United States Patent [19]

Koci

[11] Patent Number: 4,648,884
[45] Date of Patent: Mar. 10, 1987

[54] SOLUTIONS OF ANIONIC DYES WITH ALKYLENE GLYCOL MONO-ALKYL ETHERS

[75] Inventor: Zdenek Koci, Binningen, Switzerland

[73] Assignee: Ciba-Geigy Corporation, Ardsley, N.Y.

[21] Appl. No.: 755,887

[22] Filed: Jul. 17, 1985

[30] Foreign Application Priority Data

Jul. 26, 1984 [CH] Switzerland .......................... 3622/84

[51] Int. Cl.$^4$ .......................... C09B 67/26; D06P 1/39
[52] U.S. Cl. .......................................... 8/527; 8/402; 8/436; 8/499; 8/582; 8/609; 8/680; 8/685; 8/919
[58] Field of Search ........................ 8/527, 582, 609

[56] References Cited

U.S. PATENT DOCUMENTS

| | | | |
|---|---|---|---|
| 3,671,176 | 6/1972 | Kaufmann et al. | 8/527 |
| 4,073,615 | 2/1978 | Lacroix et al. | 8/527 |
| 4,098,569 | 7/1978 | Lacroix et al. | 8/527 |
| 4,322,415 | 3/1982 | Abel et al. | 424/226 |
| 4,405,329 | 9/1983 | Abel et al. | 8/527 |

FOREIGN PATENT DOCUMENTS 0026886 4/1981 European Pat. Off. .

OTHER PUBLICATIONS

Chemical Abstract-95 -8742a (1981).

Primary Examiner—A. Lionel Clingman
Attorney, Agent, or Firm—Edward McC. Roberts; Meredith C. Findlay

[57] ABSTRACT

The invention relates to aqueous/organic or purely organic solutions of anionic dyes, the principal feature of which solutions is that they contain the dye or dyes, dissolved in a $C_1$–$C_4$ monoalkyl ether of propylene glycol, or of butylene glycol, or in a $C_1$–$C_4$ carboxylic acid ester thereof, or in a mixture of these solvents. Such dyestuff solutions are storage stable and are especially suitable for spray dyeing leather.

9 Claims, No Drawings

SOLUTIONS OF ANIONIC DYES WITH ALKYLENE GLYCOL MONO-ALKYL ETHERS

The present invention relates to solutions of anionic dyes, to a process for their preparation and to the use thereof for dyeing and printing leather, wood, paper, and textile materials.

Liquid dye formulations, such as solutions or dispersions, have a number of advantages over powdered formulations, for example no dust formation when preparing padding liquors and dyebaths or also printing pastes, no wetting problems caused by lump formation, and no specky dyeings resulting from insufficiently dissolved or insufficiently finely dispersed dye particles. However, the shelf life of liquid formulations is often quite unsatisfactory on prolonged storage as compared with correspondingly formulated dye powders or granulates. Thus recrystallisation often occurs, i.e. the formation of agglomerates or even of a solid sediment. Undissolved dye particles not only lead to specky dyeings, but are also particularly troublesome whenever it is desired to apply the formulations in question to the respective substrate by spraying. In this case even small dye particles often clog the nozzle. For this reason, in the past a large number of liquid formulations have been developed, which comprise a true solution of the dye and to which a largely satisfactory storage stability has been imparted by the choice of suitable solvents and assistants. The liquid formulations disclosed in German Offenlegungsschrift 28 02 326 are cited here by way of example. Such liquid formulations often contain organic solvents, for example dimethylformamide or cellosolve solvents, which are generally undesirable for reasons of industrial hygiene. In addition, in spray dyeing, especially in the spray dyeing of leather, it is generally preferred to use readily volatile solvents in order to keep the drying times as short as possible. The liquid formulations disclosed in European patent application No. 0 041 239 contain, for example, nonionic hydrotropic compounds, some of which adversely affect the drying rate on account of their low volatility.

It is therefore the object of the present invention to provide solutions of anionic dyes which are storage-stable, i.e. which can be readily kept for several months in the temperature range from $+40°$ to $-10°$ C., and which contain sufficient volatile solvent to enable them to be used in spray application without difficulty. A further requirement was to ensure that that the novel dye solutions, depending on their use, would be readily soluble in aqueous, aqueous-organic or pure organic application solutions.

Surprisingly, it has been found that a small class of solvents meets these requirements, namely $C_1-C_4$ monoalkyl ethers of propylene glycol and of butylene glycol and the $C_1-C_4$ carboxylic acid esters thereof.

Accordingly, the present invention provides stable concentrated aqueous-organic or pure organic solutions of anionic dyes, which solutions contain the dye, or a mixture of anionic dyes, dissolved in a $C_1-C_4$ monoalkyl ether of propylene glycol, or of butylene glycol, or a $C_1-C_4$ carboxylic acid ester thereof, or dissolved in a mixture of said solvents, and which may contain further assistants.

Examples of suitable anionic dyes in the context of this invention are the direct, acid, chromium, developed, mordant and, in particular, metal complex dyes listed e.g. in the Colour Index, Vol. III. These dyes are, for example, formazane, anthraquinone, azo, nitro, methine, triphenylmethane, xanthone, naphthazarine, quinophthalone and phthalocyanine dyes which contain sulfonic acid or carboxylic acid groups, and, in particular, metal complex dyes which optionally contain sulfonic acid or carboxylic acid groups. It will be readily understood that metal complex dyes can also have anionic character without acid groups in the molecule, depending on the valency of the central metal atom and on the charge carried by the ligand.

Suitable metal complex dyes are e.g. 1:1 or 1:2 metal complexes of azo or azomethine dyes or metallised phthalocyanines, preferably copper phthalocyanine or nickel phthalocyanine. Preferred 1:1 and 1:2 metal complexes are 1:1 nickel complexes, 1:1 cobalt complexes, 1:1 copper complexes, 1:1 chromium complexes, 1:1 iron complexes or symmetrical or asymmetrical 1:2 cobalt complexes, 1:2 iron complexes or 1:2 chromium complexes, of in particular o-carboxy-o'-hydroxyazo dyes, o-hydroxy-o'-aminoazo dyes or o,o'-dihydroxyazo dyes of the benzene-azobenzene, naphthalene-azonaphthalene, benzene-azonaphthalene, benzene-azopyrazolone, benzene-azopyridone or benzene-azoacetoacetamide type, which groupings may be unsubstituted or substituted. Examples of possible substituents are: unsubstituted or substituted sulfamoyl or sulfonyl, halogen or the nitro group, and also the sulfo or carboxyl group.

The copper and nickel phthalocyanines employed in this invention are derived from the customary mixtures with a differing degree of sulfonation and contain, for example, 2 to 3 or also 4 sulfated $\beta$-or $\gamma$-hydroxyalkylsulfamoyl groups, but may also additionally contain individual halogen atoms and individual sulfamoyl groups, which last mentioned groups may be unsubstituted or substituted at the nitrogen atom, for example by alkyl groups such as methyl, ethyl, propyl or hydroxy-lower alkyl groups, for example 2-hydroxyethyl, 2-hydroxypropyl or 3-hydroxypropyl.

In the liquid formulations of this invention it is preferred to use the anionic dyes in the form of the metal salts obtained in the synthesis, for example the lithium, potassium, magnesium or, preferably, sodium salts. However, they may also be used in the form of their alkanolamine and amine salts.

The dyes may also be in the form of mixtures with one another or with dyes of another type.

The dyes eligible for use in the practice of this invention are known and can be obtained by known methods. Normally they can be used either as dried salt-containing dye filter cake or as partly or almost completely salt-free dyes from which the salts have been removed by various known methods including membrane separation methods, for example as described in European patent specification No. 41 240.

The specific solvents or mixtures of solvents employed in the liquid formulations, i.e. the $C_1-C_4$ monoalkyl ethers of propylene glycol or butylene glycol or the $C_1-C_4$ carboxylic acid esters thereof, are for example the following compounds: 1-methoxy-2-propanol, 2-methoxy-1-propanol, 1-ethoxy-2-propanol, 2-ethoxy-1-propanol, 1-propoxy-2-propanol, 2-propoxy-1-propanol, 1-n-butoxy-2-propanol, 2-n-butoxy-1-propanol, 1-isobutoxy-2-propanol, 2-isobutoxy-1-propanol, 2-methoxy-1-butanol, 3-methoxy-1-butanol, 1-methoxy-2-butanol, 3-methoxy-2-butanol, 2-ethoxy-1-butanol, 3-ethoxy-1-butanol, 4-ethoxy-1-butanol, 3-ethoxy-2-butanol, 2-propoxy-1-butanol, 3-propoxy-1- butanol, 4-propoxy-1-butanol, 3-propoxy-2-butanol, 3-n-butoxy-1-butanol, 3-isobutoxy-1-butanol. On account of their volatility, these monoalkyl ethers of propylene and butylene glycol are particularly suitable for spray solutions, in particular for spray dyeing leather. It is preferred to use the monomethyl or monoethyl ethers of propylene glycol or butylene glycol, in particular: 1-methoxy-2-propanol, 1-ethoxy-2-propanol, 2-methoxy-1-propanol, 3-methoxy-1-butanol and 2-methoxy-1-butanol. The methoxypropanols in particular are characterised by a wide range of application.

Good results are also obtained with the $C_1$–$C_4$carboxylic acid esters, in particular the $C_1$–$C_2$carboxylic acid esters, of the above specified monoalkyl ethers of propylene glycol and butylene glycol.

Representative examples are 1-methoxy-2-propylpropionate, 1-ethoxy-2-propylacetate, 2-methoxy-1-butylacetate, 3-methoxy-1-butylacetate and, in particular, 1-methoxy-2-propylacetate and 2-methoxy-1-propylacetate.

In addition to the pure solvents, it is also possible to use mixtures of solvents, preferably mixtures of 1-ethoxy-2-propanol and 3-methoxy-1-butanol, of 1-methoxy-2-propanol and 3-methoxy-1-butanol, of 1-methoxy-2-propanol, 2-methoxy-1-propanol and 2-methoxy-1-butanol, and of 1-methoxy-2-propanol ands 1-methoxy-2-propylacetate or 2-methoxy-1-propylacetate.

The dye solutions of this invention advantageously contain 10 to 40% by weight of anionic dye and 40 to 90% by weight of one or more of the above mentioned solvents.

Besides the specified solvents, it is convenient to add, depending on the dye, up to 30% by weight, based on the entire formulation, of an antifreeze agent, for example a $C_2$–$C_4$glycol, preferably, ethylene glycol, propylene glycol, butylene glycol or diethylene glycol, in order to improve the storage stability further.

Further suitable assistants are solubilisers such as alicyclic alcohols, in particular tetrahydrofurfuryl alcohol and ketone alcohols, preferably diacetone alcohol. These are added in an amount of up to 9% by weight, based on the total formulation. It is convenient to add those alicyclic alcohols and diacetone alcohols having a boiling point in the range from 120° to 170° C.

Especially as regards spray application, wetting problems and difficulties with respect to the levelness of the dyeing can arise, depending on the properties of the material to be dyed. Unexpectedly, the addition of an anionic or nonionic surfactant proves exceedingly effective, i.e. the use properties of the dye solutions can be substantially improved by adding surface active agents.

Excellent results are obtained in particular with the following surfactants when spray dyeing leather with the formulations of the invention:

Nonionic or anionic fluorinated wetting agents. These are primarily surfactants which contain, as hydrophobic moiety, a perfluoroalkyl group, preferably a branched or unbranched $C_4$–$C_{12}$perfluoroalkyl group and, as hydrophilic moiety, water-solubilising groups, for example sulfo groups or nonionic groups such as a polyoxyalkylene group. Examples of such surfactants are the N-perfluoroalkyl-N-methylpolyoxyalkylenecarbamidates. These surfactants are described e.g. in Seifen, Oele, Fette, Wachse (Soaps, Oils, Fats, Waxes) 15 (1978), pp. 429–432. Good results are also obtained, inter alia, with perfluorooctanesulfonic acid, which is employed in the form of the free acid or of the alkali metal salt or ammonium salt or tetraalkylammonium salt.

Long chain acetylene glycols: these compounds belong to the group of the nonionic surfactants, preferably those containing 8 to 20 carbon atoms in the molecule and, of these, in particular the symmetrical types carrying a central triple bond. Acetylene glycols give not only dye solutions with good wetting capacity but, in addition, lower the viscosity of the spray solution. Examples of suitable compounds are: 4-octyne-3,6-diol, 2,7-dimethyl-4-octyne-3,6-diol, 3,6-dimethyl-4-octyne-3,6-diol, 5-decyne-4,7-diol, 2,9-dimethyl-5-decyne-4,7-diol, 4,7-dimethyl-5-decyne-4,7-diol, 2,4,7,9-tetramethyl-5-decyne-4,7-diol or 2,5,8,11-tetramethyl-6-dodecyne-5,8-diol. Preferred are branched chain acetylene glycols in particular 2,4,7,9-tetramethyl-5-decyne-4,7-diol and 3,6-dimethyl-4-octyne-3,6-diol. It has hitherto been known to use such compounds as antifoams for aqueous solutions.

Silicone surfactants: these compounds will be understand as meaning in this context silicone surfactants based on alkylsiloxane/alkylene oxide copolymers. Such surfactants also belong to the group of the nonionic surfactants. The hydrophobic moiety of these surfactants is a polysiloxane radical, usually a dimethylpolysiloxane radical, and the hydrophilic moiety is an ethylene oxide or ethylene oxide/propylene oxide chain. Such surfactants are described e.g. in ADR, May 1982, pp. 45–50.

The nonionic and anionic surfactants mentioned above act, especially on leather, as excellent penetration accelerators and they have good wetting and levelling properties without in any way adversely affecting the storage stability of the formulations. The surfactants are effective even in low concentration: 0.2 to 2% by weight, based on the final formulation, often fully suffices. Aside from surfactants or mixtures of one class of surfactant (mixtures of oligomers), surfactants of different classes can be combined with one another.

The dye solutions of this invention preferably have the following composition:

10 to 40% by weight of anionic dye, in particular a metal complex dye or a mixtures of such dyes,
40 to 80% by weight of a $C_1$–$C_4$monoalkyl ether of propylene glycol or butylene glycol or of a $C_1$–$C_4$carboxylic acid ester of such ethers or of a mixture thereof.

and, if desired, one or more of the following components:

2 to 30% by weight of one or more $C_2$–$C_4$glycols,
2 to 9% by weight of tetrahydrofurfuryl alcohol or diacetone alcohol, and
0.1 to 2% by weight of an anionic and/or a nonionic surfactant.

In addition to these purely organic dye solutions, the present invention also relates to organic/aqueous dey solutions. These last mentioned solutions advantageously comprise the above mentioned components and additional contain up to 40% by weight of water as further component.

The dye solutions of this invention are prepared by first dissolving the anionic dye or the dye mixture in the $C_1$–$C_4$monoalkyl ether of propylene glycol or of butylene glycol or in the $C_1$–$C_4$carboxylic acid ester thereof, or in a mixture of said solvents, at 10° to 70° C. After cooling the solution, any precipitated or insoluble constituents are separated, for example by filtration, ultracentrifuging or, simply, by decantation. Then, in an optional further step, the assistants individually listed above are added to the solution, which is adjusted to the desired tinctorial strength by the further addition of monoalkyl ethers of propylene glycol or butylene glycol or of esters thereof and/or water. As at the start the dye is dissolved only in the organic solvent, insoluble constituents, especially inorganic salts with which the dye is contaminated in the course of the synthesis, can be separated easily and almost completely. This is particularly important with regard to the shelf life of the final dye solution. In salt-containing dye solutions, the dye has a much greater propensity to recrystallise and to form agglomerates than in solutions of low salt content or salt-free solutions. The dye may, of course, be used not only in the form of the salt-containing crude dye, dried or as moist filter cake, but also of the pure dye powder or aqueous dye solution. If the aqueous dye solution is used, then it is conveniently freed from salts beforehand by means of a membrane separation process, for example by ultrafiltration or hyperfiltration.

The dye solutions of the present invention are of low viscosity, concentrated and storage stable and can be readily incorporated in organic, aqueous-organic or purely aqueous application solutions. They are suitable both for the preparation of spray solutions and of padding liquors, dyebaths or printing pastes, and they can also be further processed to writing inks or pastes or also to printing inks, for example for ink pads or visual reading instruments. Depending on the dye, the solutions described above are suitable for dyeing and printing a very wide range of different substrates, for example textile materials, wood, paper, but especially for spray dyeing leather.

The invention is illustrated by the following Examples, in which parts and percentages are by weight.

EXAMPLE 1

With stirring, 31 parts of the dye of the formula

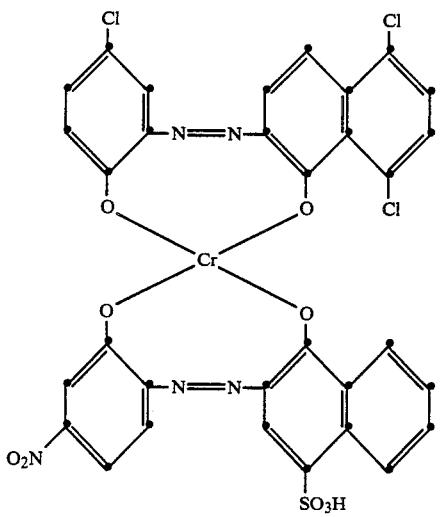

are added at +50° C. over 5 minutes to the following solvent/surfactant mixture:
47.5 parts of 1-methoxy-2-propanol
20.0 parts of diethylene glycol and
1.5 parts of a 50% solution in ethylene glycol of 2,4,7,9-tetramethyl-5-decyne-4,7-diol.

The dye is added as sodium chloride containing crude dye. After stirring for 2 hours at 50° C., stirring is continued for a further 2 hours at room temperature.

To remove undissolved constituents (impurities), the solution is treated in a laboratory ultracentrifuge for 20 minutes at 4000 rpm and the treated solution is additionally filtered through a 5 μm filter, affording 95 parts (95% yield) of a low viscosity homogeneous solution which is stable after storage for 3 months at +40° C. and at −10° C., i.e. which exhibits no precipitation (crystallisation) of the dye.

Application as spray solution: a spray solution is prepared, consisting of 10% of the above described liquid dye formulation, 10% of 1-methoxy-2-propanol and 80% of water. When sprayed on leather tanned with chromium salts, this solution provides a rapid wetting of very good levelness. After drying, a leather sample dyed in a strong dark blue level shade is obtained.

EXAMPLE 2

In accordance with the procedure of Example 1, a liquid dye formulation of the following composition is prepared:

22.5 parts of the dye of the formula

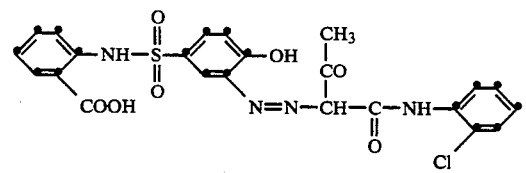

1:2 cobalt complex
70 parts of 1-ethoxy-2-propanol and
7.5 parts of 3-methoxy-1-butanol.

The dye formulation is stable after storage for 3 months at +40° C. and at −10° C. Application to leather as described in Example 1 also gives a level dyeing.

EXAMPLE 3

In accordance with the procedure of Example 1, a liquid dye formulation of the following composition is prepared:

30 parts of the dye (mixture of dyes) of the formula
(1:1 chromium complex of the individual dyes)

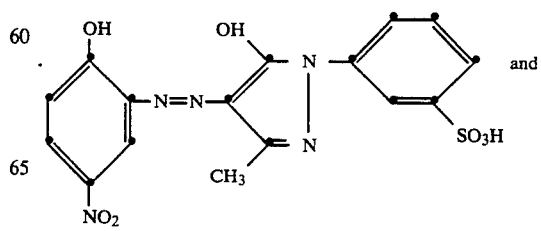

-continued

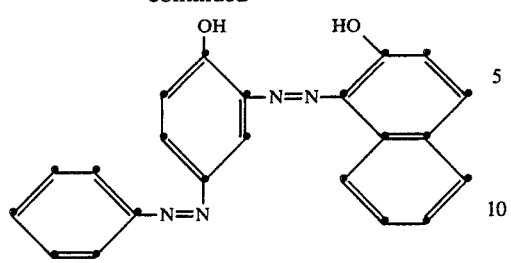

45 parts of 1-methoxy-2-propanol 20 parts of 3-methoxy-1-butanol and 5 parts of tetrahydrofurfuryl alcohol.

The dye formulation is stable after storage for 3 months at +40° C. and at −10° C. Application to leather as described in Example 1 likewise gives a perfect level dyeing.

EXAMPLE 4

In accordance with the procedure of Example 1, a liquid formulation of the following composition is prepared:

25 parts of the dye of the formula

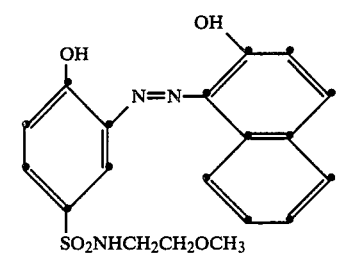

1:2 cobalt complex 54 parts of a mixture of c. 90% 1-methoxy-2-propanol and c. 10% 2-methoxy-1-propanol 20 parts of 2-methoxy-1-butanol 1 part of a methyl siloxane/ethylene oxide copolymer containing 88% by weight of ethylene oxide and having an HLB value of 17.6.

The liquid dye formulation is stable after storage for 3 months at +40° C. and at −10° C. Application to leather as described in Example 1 gives rapid wetting and a level dyeing.

A dye formulation of equally good storage stability with rapid wetting and which gives a level dyeing on leather is obtained by using the same amount of the tetraethylammonium salt of perfluorooctanesulfonic acid instead of the siloxane copolymer surfactant.

EXAMPLE 5

With stirring, 23 parts of the dye of the formula

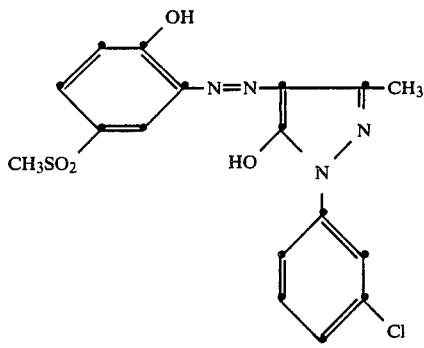

1:2 chromium complex are added at 50° C. over 5 minutes to 72 parts of 1-ethoxy-2-propanol. The mixture is stirred for 2 hours at 50° C. and then for a further 2 hours at room temperature. The solution is then treated in a laboratory centrifuge (20 minutes at 4000 rpm) and the solution which has been freed from insoluble constituents is filtered through a 5 μm nylon filter. Then 5 parts of water are added to the dye solution, affording 90 parts (90% yield) of a low viscosity dye solution which is stable for 3 months at +40° C. and at −10° C. and gives level dyeings when applied to leather as described in Example 1.

EXAMPLE 6

In accordance with the procedure of Example 1, a liquid dye formulation of the following composition is prepared:

22 parts of the dye of the formula

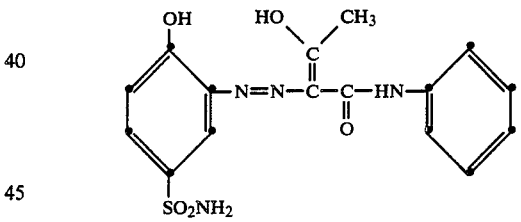

1:2 cobalt complex 53 parts 1-methoxy-2-propanol 20 parts of methoxypropyl acetate and 5 parts of propylene glycol.

The liquid dye formulation is stable on storage for 3 months at +40° C. and at −10° C. and gives a perfect level dyeing when applied to leather as described in Example 1.

A dye formulation with comparably good storage stability and corresponding performance properties is obtained by using the same amount of 1-ethoxy-2-propylacetate, 1-methoxy-2-propylpropionate or 2-methoxy-1-butylacetate instead of methoxypropylacetate.

EXAMPLE 7

In accordance with the procedure of Example 1, a liquid dye formulation of the following composition is prepared:

28 parts of the dye of the formula

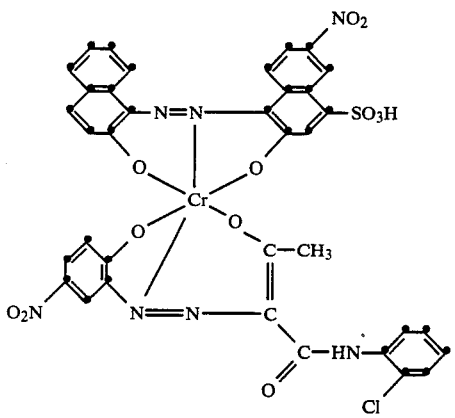

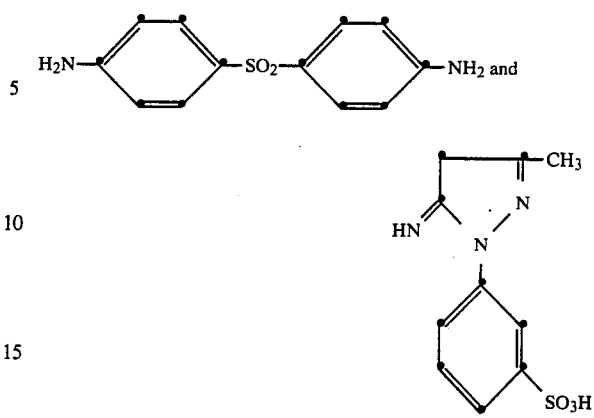

67 parts of 1-isopropoxy-2-propanol and
5 parts of tetrahydrofurfuryl alcohol.

The liquid formulation is stable on storage for 3 months at +40° C. and at −10° C. and gives a perfect level dyeing when applied to leather as described in Example 1.

A dye formulation which is also storage stable and suitable for spray dyeing leather is obtained by using the same amount of 1-isobutoxy-2-propanol instead of isopropoxypropanol.

EXAMPLE 8

With stirring, 25 parts of the dye of the formula

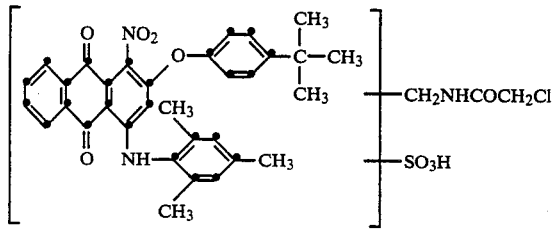

are added at 55° C. over 5 minutes to 60 parts of 1-methoxy-2-propanol. The dye is used as NaCl-containing crude dye. The mixture is then stirred for 2 hours at room temperature. The solution is then centrifuged in a laboratory centrifuge (20 min. at 4000 rpm), freed from undissolved constituents and filtered through a 5 μm nylon filter. Subsequently 15 parts of water are added to the treated dye solution, affording 90 parts (90% yield) of a low viscosity dye solution which is stable for 3 months at +40° C. and at −10° C. and which gives level dyeings when applied to leather as described in Example 1.

A storage-stable liquid formulation is also obtained by using the same amount of 2-propoxy-1-butanol instead of 1-methoxy-2-propanol.

EXAMPLE 9

In accordance with the procedure of Example 1, a liquid dye formulation of the following composition is prepared:

16 parts of a mixture, of low salt content, of the individual dyes of the formula 5 parts of tetrahydrofurfuryl alcohol
48 parts of 1-ethoxy-2-propanol and
30 parts of water.

The liquid dye formulation is stable on storage for 3 months at +40° C. and at −10° C. and gives a perfect level dyeing when applied to leather as described in Example 1.

A storage stable liquid formulation is also obtained by using the same amount of 3-butoxy-1-butanol instead of ethoxypropanol.

EXAMPLE 10

With stirring, 23.4 parts of the dye of the formula

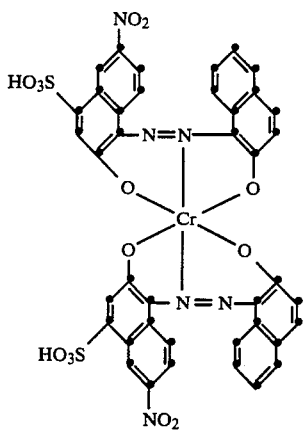

(as trisodium salt) and 2.5 parts of the dye of the formula as indicated in Example 7 are added at 55° C. over 10 minutes to 59.1 parts of 1-methoxy-2-propanol.

After stirring for 1 hour at 55° C. and for a further 2 hours at room temperature, the solution is centrifuged in a laboratory centrifuge (20 minutes at 4000 rpm), freed from undissolved constituents and filtered through a 5 μm filter. To the dye solution so obtained are then added 15 parts of water, affording 92 parts (92% yield) of a low viscosity dye solution which is stable on storage for 3 months at +40° C. and at −10° C.

When this dye formulation is used for dyeing wool or polyamide, a level dyeing is obtained on these fabrics. Dyeing is carried out by the exhaust process for 1 hour at 98° C., using 5% of the liquid formulation with the addition of 2% of ammonium sulfate and 2% of fatty amine ethoxylate as levelling agent, these amounts being based on the polyamide or wool fabric. Upon termination of the dyeing time, the textile fabric is removed from the bath, rinsed with water and dried.

What is claimed is:

1. A solution of anionic dye which consists essentially of:
   (a-1) at least one anionic dye; and
   (a-2) at least one solvent selected from the group consisting of propylene glycol $C_1$–$C_4$-monoalkyl ether, butylene glycol $C_1$–$C_4$-monoalkyl ether, and a $C_1$–$C_4$-carboxylic acid esters of such ethers;
or
   (b-1) at least one anionic dye; and
   (b-2) at least one solvent selected from the group consisting of propylene glycol $C_1$–$C_4$-monoalkyl ether, butylene glycol $C_1$–$C_4$-monoalkyl ether, and a $C_1$–$C_4$-carboxylic acid esters of such ethers; and
   (b-3) water.

2. A dye solution according to claim 1, wherein the solvent is a monomethyl or monoethyl ether of propylene glycol or of butylene glycol.

3. A dye solution according to claim 1, wherein the solvent is 1-methoxy-2-propanol, 2-methoxy-1-propanol, 3-methoxy-1-butanol, 2-methoxy-1-butanol, 1-ethoxy-2-propanol, 1-methoxy-2-propylacetate, 2-methoxy-1-propylacetate, or a mixture of 1-ethoxy-2-propanol and 3-methoxy-1-butanol, of 1-methoxy-2-propanol and 3-methoxy-1-butanol, of 1-methoxy-2-propanol, 2-methoxy-1-propanol and 2-methoxy-1-butanol, of 1-methoxy-2-propanol and 1-methoxy-2-propylacetate or of 1-methoxy-2-propanol and 2-methoxy-1-propylacetate.

4. A dye solution according to claim 1, which contains 10 to 40% by weight of anionic dye and 40 to 90% by weight of solvent.

5. A solution of anionic dye which consists essentially of:
   (a-1) at least one anionic dye;
   (a-2) at least one solvent selected from the group consisting of propylene glycol $C_1$–$C_4$-monoalkyl ether, butylene glycol $C_1$–$C_4$-monoalkyl ether, and a $C_1$–$C_4$-carboxylic acid esters of such ethers; or
   (a-3) water; and
   (a-4) at least one additive selected from the group consisting of $C_2$–$C_4$-glycols, tetrahydrofurfuryl alcohol, diacetone alcohol, and anionic and nonionic surfactants.

6. A dye solution according to claim 5, wherein the anionic or nonionic surfactant is a perfluoroalkylsulfonic acid containing 4 to 12 carbon atoms in the alkyl moiety, a symmetrical acetylene glycol containing 10 to 14 carbon atoms in the carbon backbone or a silicone surfactant based on an alkylsiloxane/alkylene oxide copolymer.

7. A solution of anionic dye according to claim 1 which consists essentially of:
   (a) 10 to 40% by weight of at least one anionic dye;
   (b) 40 to 80% by weight of at least one of the group consisting of $C_1$–$C_4$-monoalkyl ether of propylene glycol or butylene glycol or $C_1$–$C_4$-carboxylic acid esters of such ethers; and
   (c) up to 40% by weight water;
and which further contains at least one of the group consisting of:
   (i) 2 to 30% by weight of at least one $C_2$–$C_4$-glycol;
   (ii) 2 to 9% by weight of tetrahydrofurfuryl alcohol or diacetone alcohol; and
   (iii) 0.1 to 2% by weight anionic or nonionic surfactant.

8. A dye solution according to claim 7 wherein said anionic dye is a metal complex dye.

9. A process for the preparation of a dye solution as claimed in claim 1, which comprises dissolving an anionic dye, or a mixture of anionic dyes, in a $C_1$–$C_4$-monoalkyl ether of propylene glycol or of butylene glycol or a $C_1$–$C_4$carboxylic acid ester thereof, or in a mixture of said solvents, at a temperature in the range from 10° to 70° C., if necessary freeing the solution from insoluble constituents at room temperature, and optionally further adding one or more $C_1$–$C_4$glycols, tetrahydrofurfuryl alcohol, diacetone alcohol, an anionic and/or a nonionic surfactant, and adjusting said solution to the desired tinctorial strength by the further addition of a monoalkyl ether of propylene glycol or butylene glycol or an ester thereof and/or water.

* * * * *